US010743279B2

(12) United States Patent
Vrzic et al.

(10) Patent No.: US 10,743,279 B2
(45) Date of Patent: *Aug. 11, 2020

(54) NETWORK REGISTRATION AND NETWORK SLICE SELECTION SYSTEM AND METHOD

(71) Applicant: HUAWEI TECHNOLOGIES CO., LTD., Shenzhen (CN)

(72) Inventors: Sophie Vrzic, Kanata (CA); Jaya Rao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,398

(22) Filed: Aug. 26, 2019

(65) Prior Publication Data

US 2019/0380104 A1 Dec. 12, 2019

Related U.S. Application Data

(63) Continuation of application No. 15/886,257, filed on Feb. 1, 2018, now Pat. No. 10,397,892.

(Continued)

(51) Int. Cl.
*H04W 4/00* (2018.01)
*H04W 60/04* (2009.01)
(Continued)

(52) U.S. Cl.
CPC ........... *H04W 60/04* (2013.01); *H04W 28/26* (2013.01); *H04W 48/18* (2013.01); *H04W 76/12* (2018.02); *H04W 76/27* (2018.02); *H04W 48/16* (2013.01)

(58) Field of Classification Search
CPC ..... H04W 60/04; H04W 76/27; H04W 28/26; H04W 48/16; H04W 48/18
See application file for complete search history.

(56) References Cited

U.S. PATENT DOCUMENTS 10,397,892 B2 * 8/2019 Vrzic ............... H04W 48/18
2016/0037340 A1 2/2016 Rayment et al.
(Continued)

FOREIGN PATENT DOCUMENTS

CN 105934926 A 9/2016

OTHER PUBLICATIONS

Mitre et al., "5G Mobile Technology: A Survey", ICT Express, No. 3, vol. 1, pp. 1-5, Jan. 22, 2016.
(Continued)

*Primary Examiner* — Barry W Taylor

(57) ABSTRACT

Implementations of a registration procedure are described. The registration procedure includes a Access and Mobility Function (AMF) selection procedure and a Session Management Function (SMF) selection procedure. The AMF receives a Non-Access Stratum (NAS) registration request pertaining a User Equipment (UE). At least partially in response to the registration request: the AMF registers the UE on the network; and establishes a Protocol Data Unit (PDU) session for the UE. The AMF transmits a registration response to the UE. An access node of the network receives a Radio Resource Control (RRC) registration request from a User Equipment (UE). At least partially in response to the registration request: The access node selects an AMF, and forwards a corresponding Non-Access Stratum (NAS) registration request to the selected AMF. The NAS registration request includes PDU session request information pertaining to the UE.

20 Claims, 9 Drawing Sheets

Related U.S. Application Data

(60) Provisional application No. 62/455,380, filed on Feb. 6, 2017, provisional application No. 62/472,739, filed on Mar. 17, 2017.

(51) Int. Cl.
*H04W 76/12* (2018.01)
*H04W 76/27* (2018.01)
*H04W 28/26* (2009.01)
*H04W 48/18* (2009.01)
*H04W 48/16* (2009.01)

(56) References Cited

U.S. PATENT DOCUMENTS

2019/0059067 A1* 2/2019 Lee .................. H04W 60/04
2019/0098537 A1* 3/2019 Qiao ................ H04W 36/0033

OTHER PUBLICATIONS

3GPP TS 23.501 V0.1.1; 3rd Generation Partnership Project;Technical Specification Group Services and System Aspects; System Architecture for the 5G System; Stage 2(Release 15), Jan. 31, 2017.
3GPP TS 23.502 V0.1.1; 3rd Generation Partnership Project; Technical Specification Group Services and System Aspects; Procedures for the 5G System; Stage 2; (Release 15), Jan. 31, 2017.
"3rd Generation Partnership Project; Technical Specification Group Services and System Aspects; Procedures for the 5G System;Stage 2; (Release 15)", 3GPP Standard; 3GPP TS 23.502, vol. SA WG2, No. V0.1.1, Jan. 26, 2017, pp. 1-46, XP051230651.
"3rd Generation Partnership Project; Technical Specification Group Services and System Aspects; System Architecture for the 5G System; Stage 2 (Release 15)", 3GPP Standard; 3GPP TS 23.501, vol. SA WG2, No. V0.1.1, Jan. 26, 2017, pp. 1-67, XP051230649.

* cited by examiner

NETWORK REGISTRATION AND NETWORK SLICE SELECTION SYSTEM AND METHOD

CROSS REFERENCE TO RELATED APPLICATIONS

This application is a continuation of U.S. patent application Ser. No. 15/886,257 filed on Feb. 1, 2018 entitled "NETWORK REGISTRATION AND NETWORK SLICE SELECTION SYSTEM AND METHOD" which claims the benefit from U.S. Provisional Patent Application Ser. No. 62/455,380, filed on Feb. 6, 2017, and to U.S. Provisional Patent Application Ser. No. 62/472,739, filed on Mar. 17, 2017 the contents of which are incorporated herein by reference.

FIELD

The present application pertains to the field of communication networks and in particular to systems and methods for registering a User Equipment (UE) to a network slice supported by a communication network.

BACKGROUND

A communication network (or simply a "network") refers to a collection of communicatively coupled devices which interoperate to facilitate communication between various endpoint devices, such as User Equipment devices. The term "User Equipment" (UE) is used herein for clarity to refer to endpoint devices which are configured to communicate with a network either via fixed line connection, or via radios operating according to a predetermined protocol. The UE includes a variety of connected devices including UEs as defined by the $3^{rd}$ Generation partnership project (3GPP), mobile devices (e.g. wireless handsets) and other connected devices, including Machine-to-Machine (M2M) devices (also referred to as Machine Type Communications (MTC) devices). A mobile device need not be mobile itself, but is a device that can communicate with a network which is capable of providing communication services in the same mode whether or not the endpoint device is mobile or stationary. A network may include, for instance, at least one of a radio access portion which interfaces directly with UEs via radio access and a fixed line portion which interfaces directly with UEs via fixed line access, in combination with a backhaul portion which connects different network devices of the network together. The network may further comprise various virtualized components as will become readily apparent herein. A primary forward looking example of such a network is a Fifth Generation (5G) network. The present application relates to inventive improvements and additions to, among other works, 3GPP Specification #23.501, "System Architecture for the 5G System", the contents of which are incorporated herein by reference.

It has been proposed that 5G networks be built with various network technologies that allow for the network to be reconfigured to suit various different needs. These technologies can also allow the network to support network slicing to create different sub-networks with characteristics suited for the needs of the traffic they are designed to support. The network may include a number of computing hardware resources that provide processors and/or allocated processing elements, memory, and storage to support functions executing on the network, as well as a variety of different network connectivity options connecting the computing resources to each other, and making it possible to provide service to mobile devices.

A service generally corresponds to a source, or a sink, for specified data communications that is available on the network. Accessing a service may involve communication between multiple endpoints that are connected to the network. A service may be provided by the network operator, or may be provided by network customer such as a business, utility, government, or other organization. Examples of services include, but are not limited to, providing audio and/or video content to stream or download to an endpoint such as a UE, storage and/or processing of data from an endpoint such as a UE, UE-to-UE messaging services, machine-to-machine communications such as utility meter reporting, remote data storage, and/or remote computing services.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources.

A UE seeking access to a service, may seek to connect directly to that service, or in some embodiments to a network slice that supports the service. The process of connecting a UE to a service and/or network slice starts with the step of registering the UE. Registration may be initiated through a radio access node (R)AN that is currently providing connection between the UE and the network.

A network entity generally refers to a network node, or a combination of network nodes, that is operative to provide specified services on the network. A network entity comprises physical components, such as processors, allocated processing elements, or other computing hardware, computer memory, communication interfaces, and other supporting computing hardware. The network entity may use dedicated physical components, or the network entity may be allocated use of the physical components of another device, such as a generic computing device or resources of a datacenter, in which case the network entity is said to be virtualized. A network entity may be associated with multiple physical components that may be located either in one location, or may be distributed across multiple locations.

A network function comprises a service that may be provided by a network entity, or may comprise physical components configured in a certain way to provide a given functionality, which may be described in terms of data inputs and outputs. In general, a network entity may be operative to support one or more network functions on the network. In some embodiments, the network entity may be abstracted across multiple physical locations of the network, for instance by execution at a plurality of network nodes, to operate in a coordinated fashion by collecting, processing, directing, and/or acting to provide the service(s) required of that network entity.

In proposed 5G networks, it is intended that the operator will be capable of deploying multiple network slices to support different services. Accordingly, the network operator can decide whether a single slice or multiple network slices are required. For example, an operator may support service types A and B within a single slice, or it may provide service type A in slice 1 and service type B in slice 2.

In order for a UE to gain access to a service operated by the network, it must register. To maintain flexibility for the network operator, it may be desirable to provide a registration procedure that is able to support a plurality of different deployment options to accommodate the different slice and service offerings.

Therefore, there is a need for a system and method for registering a UE to a network service or network slice that is not subject to one or more limitations of the prior art.

This background information is provided to reveal information believed by the applicant to be of possible relevance to the present application. No admission is necessarily intended, nor should be construed, that any of the preceding information constitutes prior art against the present application.

SUMMARY

In an implementation, a method is provided for registering a User Equipment (UE) for connection to a service available on a network. The method may include: receiving a registration request from the UE; selecting an access and mobility function (AMF) of the network based on the registration request; transmitting the registration request to the selected AMF; receiving a registration response from the selected AMF; and, transmitting the received registration response to the UE.

Accordingly, an aspect of the present invention provides a method in an access and mobility function (AMF) of a network, the method comprising: receiving, by the AMF, a Non-Access Stratum (NAS) registration request pertaining a User Equipment (UE) connected to the access node; at least partially in response to the registration request: registering the UE on the network; and establishing a Protocol Data Unit (PDU) session for the UE, based on information contained in the registration request; and transmitting, by the AMF, a registration response to the UE.

A further aspect of the present invention provides a method in an access node of a network, the method comprising: receiving, by the access node, a Radio Resource Control (RRC) registration request from a User Equipment (UE) connected to the access node; at least partially in response to the registration request: selecting an access and mobility function (AMF) based on information in the received registration request; and subsequently forwarding a corresponding Non Access Stratum (NAS) registration request to the selected AMF, the NAS registration request including PDU session request information pertaining to the UE.

A further aspect of the present invention provides a User Equipment (UE) comprising: at least one processor; and a non-transitory computer readable storage medium storing software instructions configured to control the at least on processor to: generate a Radio Resource Control (RRC) registration request for registering the UE for connection to a service available on a network, the registration request further including PDU session request information; transmit the RRC registration request to an access point of the network; and subsequently receive a registration acknowledgment from an access and mobility function (AMF) of the network.

BRIEF DESCRIPTION OF THE FIGURES

Further features and advantages will become apparent from the following detailed description, taken in combination with the appended drawings, in which.

It will be noted that throughout the appended drawings, like features are identified by like reference numerals.

DETAILED DESCRIPTION

Figure 1:
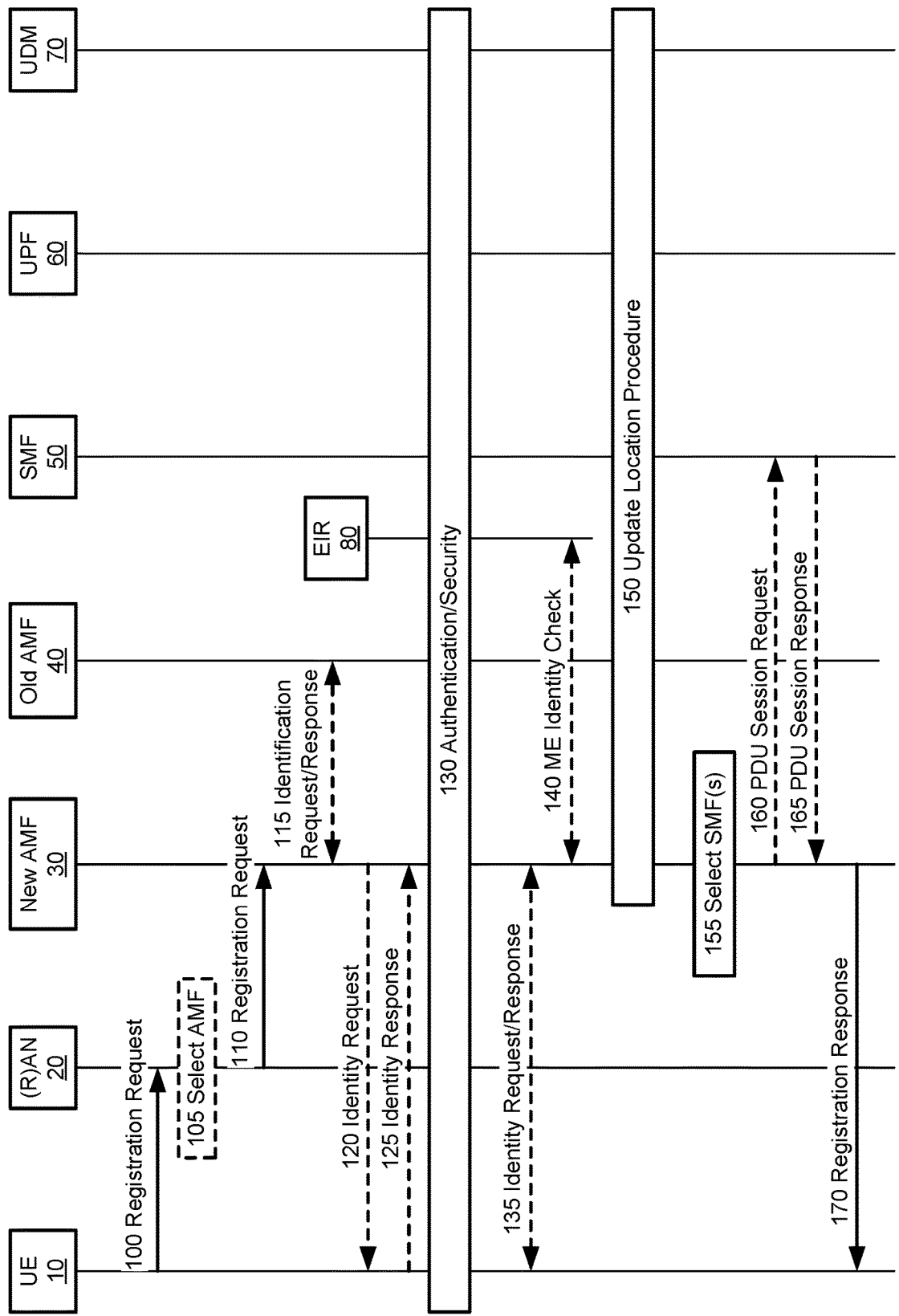
FIG. 1 is a signalling diagram illustrating an embodiment of a registration procedure.

In an implementation, this application describes a registration procedure for use when using the Network Slice Selection Assistance Information (NSSAI). The registration procedure includes the Access and Mobility Function (AMF) selection procedure and the Session Management Function (SMF) selection procedure. This invention provides details of the information that is required to perform the registration procedure. The content of the Radio Resource Control (RRC) and Non-Access Stratum (NAS) Request and Response messages are described.

It is desirable that any network slice configuration system provides sufficient flexibility to configure network slices to support a variety of specific services. In some implementations, however, it may be useful that the deployment configuration satisfies the following constraints:

- A UE should be able to attach to multiple network slices with a single AMF
- AMFs may be common to a set of network slices
- In some implementations, the slice specific functions (e.g. SMFs and UPFs) should not be shared, and instead each be dedicated to a specific slice
- Each network slice, described by an SST/SD, should only be associated with a single network slice group.

Given the above constraints, it is possible to configure Network Slice Groups (NSGs) where each group is isolated from the other groups. In some implementations, an NSG identifier (NSGI) may be configured in the UE by the Home Public Land Mobile Network (HPLMN). The UE may provide a configured NSGI in the RRC message during the initial Registration procedure. The gNB may use the NSGI in RRC to select an AMF or AMF pool for the UE. The selected AMF may select the SMFs based on the NSSAI in NAS.

The selected AMF provides the UE with a Temporary ID (Temp ID). The Temp ID can be used for subsequent Registration requests. The Temp ID can identify an AMF pool, where any AMF within the AMF pool can be used to serve the UE.

In order to minimize the overall signalling to perform the initial Registration procedure followed by a Protocol Data Unit (PDU) session establishment, in some embodiments, a combined Registration/PDU Establishment approach may be adopted where the PDU Establishment Request may be combined with the Registration procedure. For example, these embodiments may be useful for UEs that are set to create a default PDU session immediately after the Registration procedure. As another example, combining the PDU Establishment Request with the Registration procedure may be a convenient way to provide always-on capability (e.g. eMBB with always-on Internet access). The combined Registration/PDU Establishment approach reduces the overall time to perform both Registration and PDU Session Establishment procedures, and may reduce the necessary signalling over the air and in the core network.

Some of the advantages provided by embodiments of this system and method include:
- the AN (i.e. gNB) does not have to have any awareness of the network slice configuration deployed.
- The network management for network slicing is simplified since only the Network Repository Function (NRF) is updated when there are changes to the network slice configuration.
- The UE can specify one or more PDU sessions to be established during the initial registration procedure for each service/slice type requested.

In an implementation, a registration system and method are provided. Although the UE is not aware of the network slice configuration used by the operator when the UE connects to an Access Node (AN), the UE can indicate the service/slice type (SST) it is capable of and the service differentiator (SD) in the registration request. The AN uses information provided by the UE in the RRC message to determine which Access and Mobility Function (AMF) to select for the UE.

The UE may not initially require all the supported service types to be configured during the initial attach procedure. In this case, the UE can specify which service types are required initially by indicating the requested SST/SD in the registration request.

The UE may also request that multiple Protocol Data Unit (PDU) sessions be established for each SST/SD. The PDU session establishment information is included in the registration request. The PDU session information includes the Domain Network Name (DNN) for the corresponding SST/SD.

The AMF uses the requested SST/SD to select an appropriate SMF and sends a PDU session establishment request to the selected SMF to establish a PDU session with the indicated DNN.

The registration procedure is used to attach the UE to the 5G core network, which contains one or more network slices. The UE may obtain services from multiple network slices simultaneously.

During the registration procedure, the UE sends a registration request, which includes the Network Slice Selection Assistance Information (NSSAI). The NSSAI specifies the slice/service type requested by the UE. The registration request may optionally contain the PDU session establishment request information for each service/slice type requested by the UE. In some embodiments, the PDU session information may include a parameter to indicate that a default PDU session should be established for the associated slice during the initial Registration procedure.

The NSSAI is sent in the NAS message. The Radio Resource Control (RRC) message includes the Temp ID if it is assigned. Otherwise, for the initial registration, the RRC message includes the subscriber ID. The RRC message may also include additional information that may assist the RAN in selecting an AMF for the initial registration. The additional information may include, for example, a pre-configured AMF type or a pre-configured Network Slice Group ID (NSGI), which may be a standardized value or a PLMN specific value.

The UE may also be configured by the HPLMN with a Network Slice Group Indicator (NSGI). This is used by the (R)AN to select an AMF or AMF pool to serve the UE during the initial Registration procedure. Once the serving AMF is selected for the UE, the serving AMF assigns a Temporary ID for the UE. The Temp ID is used by the UE for subsequent Registration requests.

The NSSAI included in the NAS message may include:
- S-NSSAI (multiple S-NSSAI can be included i.e. one for each slice/service type request)
- Slice/Service type (SST)
- Service Differentiator (SD)

In one embodiment, the S-NSSAI may also include the PDU session establishment parameter, which indicates that a default PDU session should be established for the UE during the initial registration procedure. Alternatively, the default PDU session establishment indicator(s) can be a parameter(s).

In some embodiments, the NSSAI in RRC is a NSGI, and the NSSAI in NAS may be referred to as the Configured or Accepted set of S-NSSAI.

Referring to FIG. 1, an embodiment of a registration procedure is illustrated. In step 100, the UE 10 transmits a registration request to the serving (R)AN 20. The Registration Request includes the NSSAI in the NAS message, the UE Permanent or Temporary ID (Temp ID), security parameters. In step 105, the (R)AN 20 selects the AMF based on the information in the RRC message, which may include a Temp ID or a Network Slice Group ID (NSGI). In step 110, the (R)AN 20 node forwards the request to the new AMF 30 corresponding to the Temp ID. If there is no Temp ID and no NSGI included in the RRC, or there is no valid Temp ID, then the (R)AN 20 forwards the request to a default AMF.

In optional step 115, the new AMF 30 sends a request to the old AMF 40 to obtain the UE's information (UE Permanent ID and MM Context). In optional step 120, the new AMF 30 sends an Identity Request to the UE 10 if the registration request from step 100 did not include the UE Permanent ID, or if the UE Temporary ID was not provided by the old AMF 40 in step 115. In optional step 125, the UE 10 sends an Identity Response to the AMF, which includes the UE Permanent ID. In step 130, the new AMF 30 initiates the authentication/security procedure. In optional step 135, the new AMF 30 sends an Identity Request to the UE 10 if the registration request from step 100 did not include the ME identity, or if it was not provided by the old AMF 40 in step 115. In step 140, the new AMF 30 performs the ME identity check with the Equipment Identity Register (EIR) 80. In step 150, the location update procedure is performed. In step 155, the new AMF 30 selects SMF(s) 50 for the UE 10 based on the S-NSSAI, contained in the NAS message. In step 160, the new AMF 30 sends a PDU session request to the selected SMF(s) 50 based on the S-NSSAI. The PDU session establishment request may be generated by the UE and included in the NAS request or it may be generated by the default or serving AMF based on the parameters provided by the UE in the NAS request. Alternatively, the gNB may generate the PDU session establishment request if the UE provides the session related parameters in the RRC message. In another embodiment, the UE may provide a PDU session establishment indicator for specified S-NSSAI to indicate that a default PDU session should be established during the initial Registration procedure. The PDU session parameters may be provided by the UE or it may be obtained by the subscriber information (i.e. UDM). The PDU session related parameters include the SST/SD or SMF ID and the DNN. In optional step 165, the selected SMF(s) 50 establishes a PDU session and sends a PDU Session Response to the new AMF 30. In step 170, the new AMF 30 sends a Registration Response to the UE 10. The Registration Response includes the RRC Response, which includes the NAS Response. The NAS Response includes the Accepted NSSAI (A-NSSAI), selected SM ID(s) and optionally the PDU Session Response for each PDU session that was established in step 165. The RRC Response includes the UE Temporary ID corresponding to the selected AMF.

The gNB uses the Temp ID or the NSGI in the RRC message to select an appropriate AMF for the UE on subsequent Registration Requests. If there is no valid Temp ID or NSGI, the gNB forwards the request to the default AMF. There is one default AMF for each gNB.

There are two options for the default AMF:
First, the default AMF is only responsible for selecting an appropriate AMF and forwarding the request to the selected AMF. It is an isolated function that is not a part of any slice. It has an interface to other AMFs. In order to ensure the isolation of the slices, it does not have an interface to the SMFs.
Second, the default AMF may be a serving AMF that also performs the AMF selection procedure.

The default AMF selects the serving AMF based on the S-NSSAI included in the UE's NSSAI. The default AMF queries the Network Repository Function (NRF), which determines an appropriate AMF for the UE based on the provided S-NSSAI(s) and on the UE's subscription information contained in the Unified Data Management (UDM) function and the network slice configuration information included in the NRF. Once the default AMF selects the appropriate serving AMF, the NAS request message is directly forwarded to the selected AMF instead of redirecting the message to the gNB.

The selected AMF initiates the authentication/authorization procedure and uses the S-NSSAI to determine which SMFs to select for the UE. The AMF uses the PDU session information (i.e. PDU session establishment request for the indicated SST/SD and DNN) to determine which PDU session establishment requests to send to the selected SMFs. Alternatively, the AMF forwards the PDU session establishment indicator provided by the UE in the initial Registration procedure to the appropriate SFM(s). The SMF(s) establish the default PDU session for the UE based on the default PDU session information provided by the UE and/or the UDM.

The selected SMFs establish a PDU session and send a PDU session response to the AMF. The AMF includes the PDU session establishment response in the registration response, which is sent to the UE along with the accepted NSSAI (A-NSSAI). The registration response contains the Temp ID identifying the selected AMF and the A-NSSAI, which includes all of the services that are available for the UE. If the UE de-registers from the network and needs to re-register, the UE sends a registration request including the Temp ID in RRC and/or the A-NSSAI in NAS.

Figure 2:
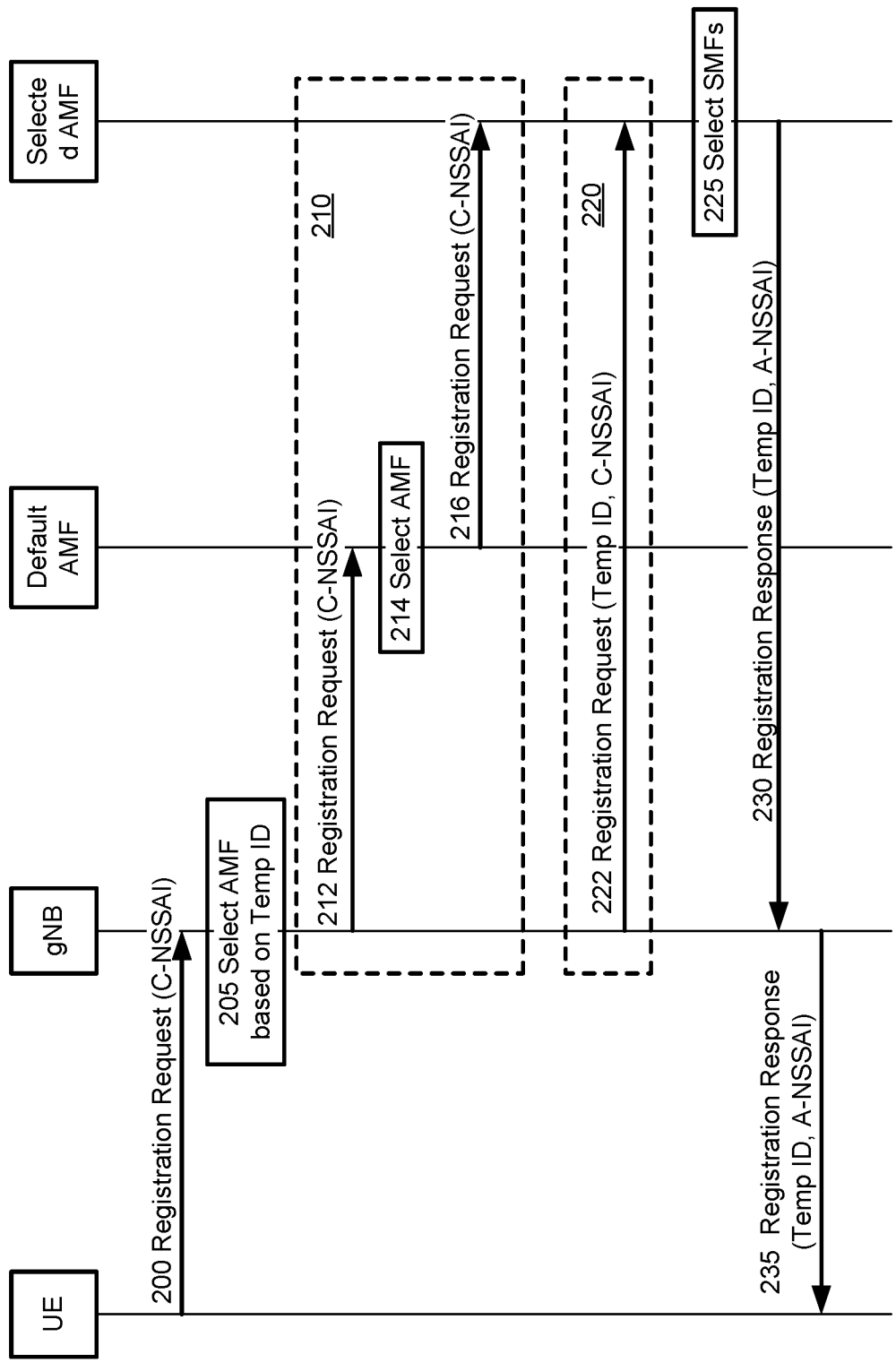
FIG. 2 is a signalling diagram illustrating an embodiment of AMF and SMF selection.

Referring to FIG. 2, a signalling diagram illustrating an embodiment of AMF and SMF selection is presented. In step 200 the UE transmits a registration request (NSSAI) to the gNB. In step 205 the gNB selects the appropriate AMF based on the Temp ID or the NSGI provided by the UE in RRC.

If neither the Temp ID nor the NSGI is available, the gNB may handle the registration request using default information as illustrated in procedure 210. In step 212, the gNB transmits the registration request to a default AMF. In step 214, the default AMF identifies and/or selects the appropriate AMF. In step 216, the default AMF transmits the registration request to the selected AMF. If the Temp ID or NSGI is available, the gNB may handle the registration request as illustrated in procedure 220. In step 222 the gNB transmits the registration request directly to the selected AMF. The transmitted registration request may include the Temp ID or NSGI provided by the UE.

In either case, in step 225 the selected AMF selects the SMF(s). In step 230 the selected AMF transmits a registration response to the gNB. The registration response may include the Temp ID, and the A-NSSAI. The registration response may also include the PDU session response if a default PDU session is established for the UE. In step 235 the registration response is forwarded by the gNB to the UE.

The AMF selects the SMFs based on the S-NSSAI included in either the C-NSSAI or the A-NSSAI. The AMF may query the Network Repository Function (NRF) if it is not able to determine the appropriate SMFs.

The NRF includes network function and slice related information required to determine the appropriate AMF and SMFs. The NRF is used to determine which slices are instantiated and available to the AMF. The NRF is configured and updated by the management plane whenever a new network slice is created or modified. The selected SMFs may also establish a PDU session if requested in the NAS message. The PDU session request may include the DNN for the corresponding SST/SD and the Session and Service Continuity (SSC) mode.

If the UE does not specify PDU session establishment information, then no PDU session is established during the registration procedure for the indicated service type (e.g. S-NSSAI). The UE may request a PDU session after the registration procedure. Alternatively, a default PDU session may be established for the UE based on the information in the UDM.

If the UE does not specify the S-NSSAI then the UE is assigned the default network slice for the UE, which is obtained from the subscription information. A default PDU session may also be established for the UE.

The NSSAI is sent in both the RRC message and in the NAS message. The NSSAI in the RRC message is the Temp ID or the NSGI. The NSSAI in the NAS message is a collection of the S-NSSAI. If the NSSAI is the C-NSSAI then the S-NSSAI is the configured S-NSSAI. Otherwise, if the NSSAI is the A-NSSAI then the S-NSSAI is the accepted S-NSSAI.

Figure 3:
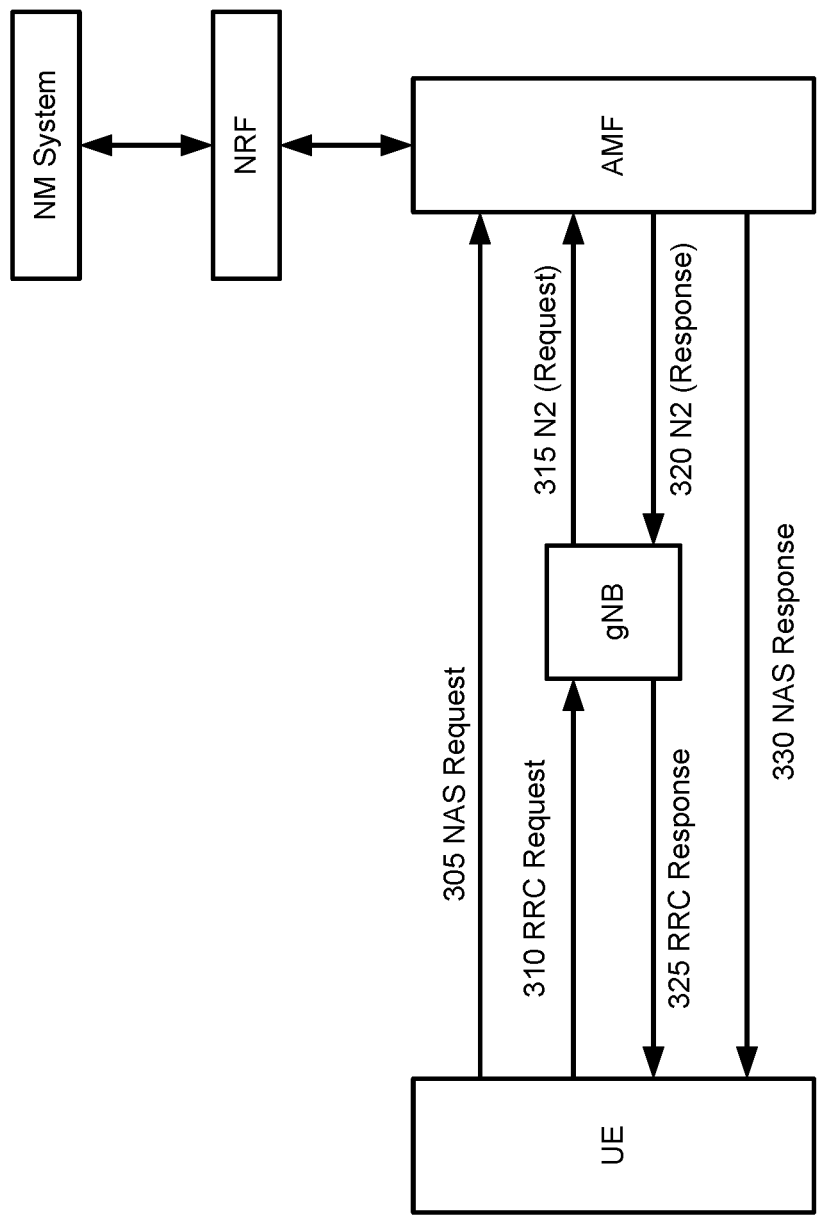
FIG. 3 is a signal flow diagram of an embodiment of registration signalling.

The content of the NSSAI in the RRC and NAS messages is illustrated in FIG. 3. UE sends C-NSSAI in the NAS Request 305 and Temp ID or NSGI in the RRC Request 310. For the initial attach, the UE does not provide a Temp ID (i.e., the Temp ID is null, it may provide the NSGI or a subscriber ID instead). The NAS information includes a collection of S-NSSAI, where each contains the SST/SD. The registration message may optionally include multiple PDU Session Requests to a specified DNN for each S-NSSAI. Alternatively, the message may include parameters for generating the PDU session establishment request. In another embodiment, the UE may provide a default PDU session establishment indicator to indicate that a default PDU session should be established for the specified or associated S-NSSAI.

The gNB selects the AMF based on the Temp ID or NSGI included in the RRC Request message. If there is no Temp ID and no NSGI or there is no valid Temp ID then the gNB sends the N2 request 315 to the default AMF, which selects a serving AMF. The AMF returns a N2 response 320 to the gNB. The RRC Response message 325 includes the Temp ID for the selected AMF.

The serving AMF selects the SMFs from the information in the NAS request message 305 containing the S-NSSAI. The serving AMF verifies the UE subscription information with the UDM. There may be fewer number of SMFs selected than the number of S-NSSAIs, which depends on the network slice configuration.

The AMF sends the PDU Session Request (if included in the NAS Request message or if generated by the AMF based on the PDU session parameters provided by the UE) to the selected SMFs. Alternatively, the AMF sends the default PDU Session Establishment indicator to the selected SMFs to indicate that a default PDU session should be established. The NAS response 330 from the AMF (containing the A-NSSAI) includes all of the SST/SD available to the UE. The AMF may also send the addresses or IDs of the selected SMFs along with the PDU Session Response. The AMF only selects SMFs for the SST/SD the UE requested. The AMF may query the NRF to determine which SMF(s) to select for the UE. The NRF is updated with the network slice configuration information by the Network Management system whenever the network slice configuration is modified.

In embodiments, the default AMF can be one of the following:

A standalone AMF that only performs the AMF selection function. It is an isolated function that is not a part of any slice. It has an interface to other AMFs. In order to ensure the isolation of the slices, it does not have an interface to the SMFs.

A serving AMF that also performs the AMF selection function.

Figure 4:
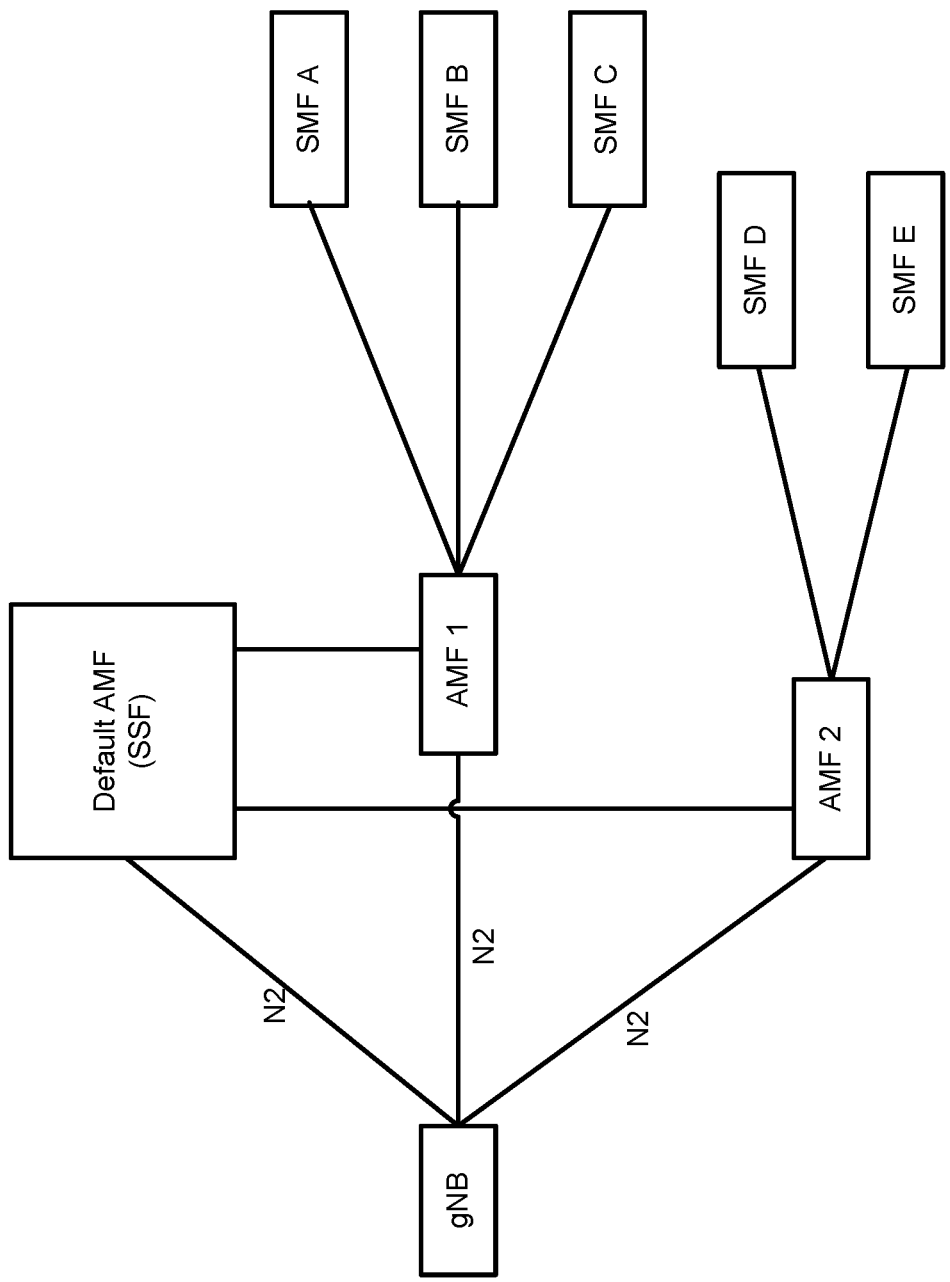
FIG. 4 is a block diagram of an embodiment of an AMF configuration.

FIG. 4 illustrates Case 1: Service types A, B and C are on separate slices.

Figure 5:
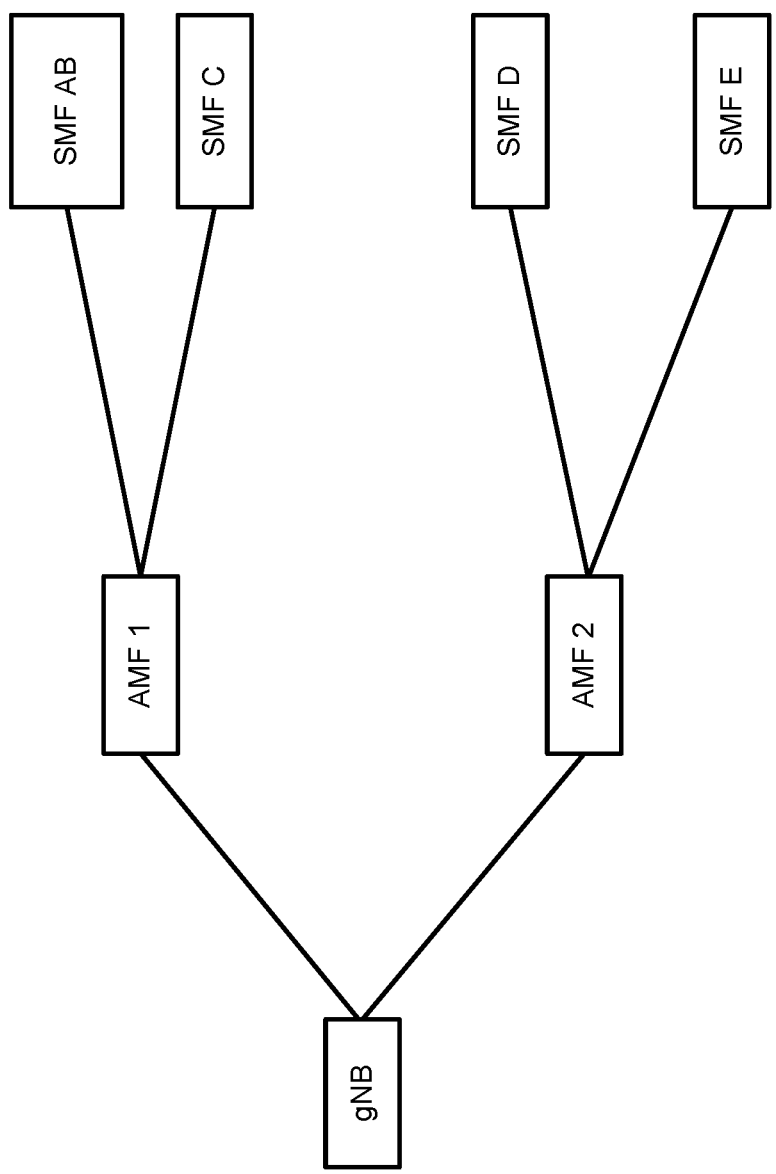
FIG. 5 is a block diagram of an embodiment of an AMF configuration.

FIG. 5 illustrates Case 2: Service types A and B are on the same slice. Service C is on a separate slice from A and B.

For the above Case 1 and Case 2, the content of the UDM, RRC Request, NAS Request, RRC Response, NAS Response messages is illustrated below:

```
UDM Information: SST/SD supported = {A,B,C}
(RRC Request)
    Temp ID = null; // This can be a previously
assigned Temp ID
    NSGI = AMF group 1
(NAS Request)
    C-NSSAI = {
        S-NSSAI = { SST/SD: A }
        S-NSSAI = { SST/SD: B }
    }
    PDU_Session_Request(A, DN1)
    PDU_Session_Request(A, DN2)
    PDU_Session_Request(B, DN3)
    Or
    C-NSSAI = {
        S-NSSAI = { SST/SD: A }
        S-NSSAI = { SST/SD: B }
    }
    Default_PDU_Session_Establishment Indicator (A)
    Default_PDU_Session_Establishment Indicator (B)
(RRC response)
    Temp_ID = xxx; // This is the ID corresponding to the
selected AMF
(NAS) Response
    Accepted NSSAI = {
    S-NSSAI = { SST/SD: A }
    S-NSSAI = { SST/SD: B }
    S-NSSAI = { SST/SD: C }
    }
```

```
    SM-IDs: {SM@A, SM@B}          // Case 1: If services A and
B are on separate slices
    SM-IDs: {SM@AB, SM@AB}        // Case 2: Services A and B
have the same SMF
    PDU_Session_Response(A, DN1),
    PDU_Session_Response(A, DN2),
    PDU_Session_Response(B, DN3)
    Or
    Accepted NSSAI = {
        S-NSSAI = { SST/SD: A }
        S-NSSAI = { SST/SD: B }
    }
    SM-IDs: {SM@A, SM@B}
    PDU_Session_Response(A, DN-X(default)),
    PDU_Session_Response(B, DN-Y(default))
```

For subsequent requests, the UE includes the assigned Temp ID in RRC.

The gNB forwards the registration message to the default AMF if there is no valid Temp ID and no NSGI. Otherwise, it forwards to the request to the AMF with the associated Temp ID.

In an alternate embodiment, the default AMF may perform the authentication/authorization procedure instead of the selected AMF.

In an alternate embodiment, the default AMF may perform the authentication/authorization procedure in addition to the selected AMF. In some embodiments, the authentication/authorization procedure may be split between the two AMFs.

In an embodiment, the Radio Access Node ((R)AN) selects the Access and Mobility Function (AMF) based only on a Temp ID or NSGI. If there is no Temp ID and no NSGI, or if there is no valid Temp ID, then the (R)AN forwards the Registration request to a default AMF, which performs the AMF selection. The AMF selection procedure uses the Network Slice Selection Assistance Information (NSSAI) and subscription information.

The SMF selection procedure is performed during the Registration procedure. The AMF selects the Session Management Function (SMF) based on the Single-NSSAI (S-NSSAI) and the UE's default configuration information included in the subscription information.

PDU Session Establishment requests may be piggybacked onto the Registration request. The UE may specify multiple PDU sessions to be established for each S-NSSAI specified in the NSSAI. In one embodiment, the Registration request may include a default PDU session establishment indicator for specified S-NSSAI.

A UE needs to register with the network to get authorized to receive services, to enable mobility tracking and to enable reachability. The Registration procedure is used e.g. when the UE needs to initially register to the 5G system, upon mobility procedure when the UE changes to a new Tracking area (TA) in idle mode and when the UE performs a periodic update (due to a predefined time period of inactivity), etc.

During the initial registration, the Permanent Equipment Identifier (PEI) is obtained from the UE. The AMF operator may check the PEI with an Equipment Identity Register (EIR). The AMF passes the PEI (e.g. the International Mobile station Equipment Identity and Software Version—IMEISV) to the Unified Data Manager (UDM), to the SMF and the Policy Control Function (PCF).

Figure 6A:
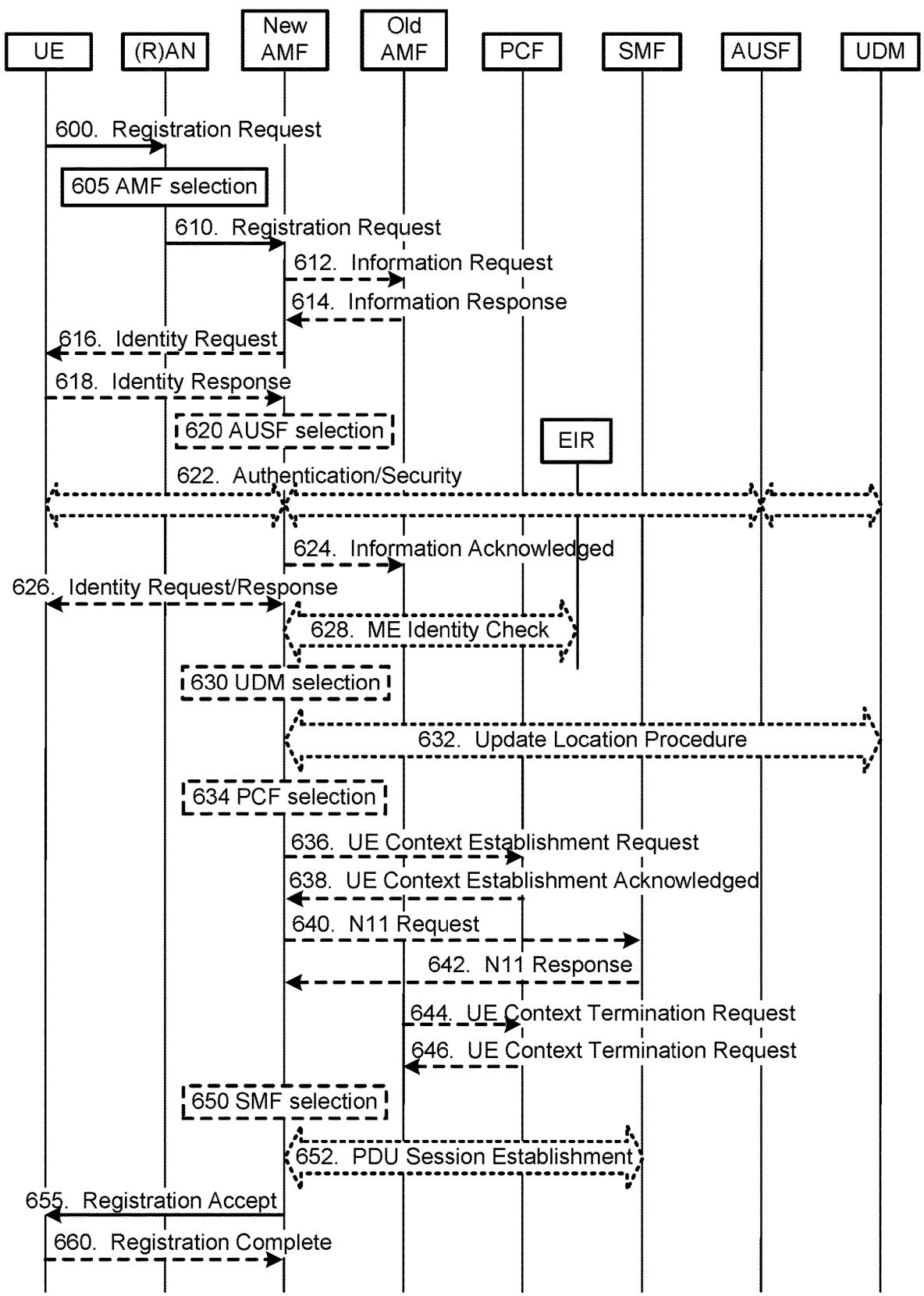
FIG. 6A is a signalling diagram illustrating an embodiment of a registration procedure.

Referring to FIG. 6A, an embodiment of a registration procedure is presented.

In step 600 the UE transmits a registration request to (R)AN: Access Node (AN) message (AN parameters, Registration Request (Registration type, Subscriber Permanent Identifier or Temporary User ID or NSGI, Security parameters, NSSAI, UE 5GCN Capability, PDU session status)). One or more PDU Session Establishment Request messages (S-NSSAI, Domain Network Name (DNN), PDU Session ID, Session Management (SM) information) may be piggybacked onto the Registration request or one or more default PDU session establishment indicators may be included in the Registration request.

In case of 5G-RAN, the AN parameters include e.g., SUPI or the Temporary User ID or NSGI, the Selected Network and NSSAI.

The Registration type indicates if the UE wants to perform an "initial registration" (i.e. the UE is in non-registered state), a "mobility registration" (i.e. the UE is in registered state and initiates a registration due to mobility) or a "periodic registration" (i.e. the UE is in registered state and initiates a registration due to the periodic update timer expired). If included, the Temporary User ID indicates the last serving AMF. The Security parameters are used for Authentication and integrity protection. NSSAI indicates the Network Slice Selection Assistance Information (as defined in clause 5.15 of TS 23.501 [2]. The PDU session status indicates the available PDU sessions in the UE.

In step 605 AMF selection is performed. If a SUPI is included or the Temporary User ID does not indicate a valid AMF and there is no NSGI, the (R)AN forwards the Registration Request to a default AMF. The default AMF is responsible for selecting an appropriate AMF for the UE. If additional information is provided in the RRC Request, the (R)AN may select the AMF.

In step 610 the (R)AN transmits a Registration Request to the selected ("new") AMF: N2 message (N2 parameters, Registration Request (Registration type, Permanent User ID or Temporary User ID or NSGI, Security parameters, NSSAI)).

When 5G-RAN is used, the N2 parameters include the Location Information, Cell Identity and the RAT type related to the cell in which the UE is camping.

In step 612 an Information Request may be sent from the new AMF to to old AMF: Information Request to complete the Registration Request.

If the UE's Temporary User ID was included in the Registration Request and the serving AMF has changed since last registration, the new AMF may send Information Request to old AMF including the complete Registration Request IE to request the UE's SUPI and MM Context.

In step 614 an Information Response (SUPI, MM Context, SMF information) may be returned by the old AMF to the new AMF in response to the Information Request 612. The old AMF responds with Information Response to the new AMF including the UE's SUPI and MM Context. If the old AMF holds information about active PDU Sessions, the old AMF may include SMF information including SMF identities and PDU session identities.

In step 616 the AMF may transmit an Identity Request to the UE. If the SUPI is not provided by the UE nor retrieved from the old AMF the Identity Request procedure is initiated by the AMF sending an Identity Request message to the UE. In response to receiving the Identity Request, the UE returns an Identity response including the SUPI in step 618.

In step 620, the AMF may decide to invoke an AUSF. In that case, the AMF shall, based on the SUPI, select an AUSF.

In step 622, the AUSF shall initiate authentication of the UE and NAS security functions. The authentication and security are performed. The procedure including AMF relocation, e.g., due to network slicing, may happen after step 622.

If the AMF has changed, in step 624 the new AMF transmits to the old AMF an Information Acknowledged message that acknowledges the transfer of UE MM context.

If the authentication/security procedure fails, then the Registration shall be rejected, and the new AMF sends a reject indication to the old AMF. The old AMF continues as if the Information Request was never received.

If the PEI was not provided by the UE nor retrieved from the old AMF, in step 626 the Identity Request procedure is initiated by AMF sending an Identity Request message to the UE to retrieve the PEI.

In optional step 628 the AMF initiates ME identity check with the EIR.

If an update location procedure step 632 is to be performed, in step 630 the AMF, based on the SUPI, selects a UDM.

If the AMF has changed since the last registration, or if there is no valid subscription context for the UE in the AMF, or if the UE provides a SUPI which doesn't refer to a valid context in the AMF, in step 632 the AMF initiates the Update Location procedure. This will include that UDM initiates Cancel Location to old AMF, if any. The old AMF removes the MM context and notifies all possibly associated SMF(s), and the new AMF creates an MM context for the UE after getting the AMF related subscription data from the UDM. In some embodiments, the PEI is provided to the UDM in the Update Location procedure.

In step 634, the AMF, based on the SUPI, may select a PCF.

In step 636 the AMF may transmit a UE Context Establishment Request to the PCF requesting the PCF to apply operator policies for the UE. Based on the UE Context Establishment Request, in step 638 the PCF returns to the new AMF a UE Context Establishment Acknowledged message that acknowledges the UE Context Establishment Request message.

If the AMF is changed, in step 640 the new AMF notifies each SMF of the new AMF serving the UE with a N11 Request.

The AMF verifies PDU session status from the UE with the available SMF information. In case the AMF has changed the available SMF information has been received from the old AMF. The AMF requests the SMF to release any network resources related to PDU sessions that are not active in the UE.

Based on the N11 Request, in step 642 the SMFs transmit a N11 Response to the new AMF. The SMF may decide to trigger e.g. UPF relocation.

If the old AMF previously requested UE context to be established in the PCF, in step 644 the old AMF transmits a UE Context Termination Request to terminate the UE context in the PCF. The PCF responds by transmitting a UE Context Termination Acknowledged message to the old AMF in step 646.

In step 650 the new AMF may select SMF(s) based on the S-NSSAI and UE subscription information in the UDM.

If PDU Session Establishment Request message(s) (S-NSSAI, DNN, PDU Session ID, SM information) are piggybacked onto the Registration Request, in step 652 the new AMF forwards the PDU Session Establishment Request to the selected SMF(s) using the PDU Session Establishment procedure. Alternatively, a default PDU session establishment indicator for specified S-NSSAI may be included in the Registration Request. The new AMF forwards the default PDU session establishment to the selected SMF(s).

In step 655 the AMF sends a Registration Accept message (Temporary User ID, Registration area. Mobility restrictions, PDU session status, NSSAI, Periodic registration update timer) to the UE indicating that the registration has been accepted. Temporary User ID is included if the AMF allocates a new Temporary User ID. Mobility restrictions is included in case mobility restrictions applies for the UE. The AMF indicates the new SMF(s) that were selected for the specified S-NSSAI. The AMF indicates the PDU session status to the UE. If PDU Session Establishment request(s) were piggybacked onto the Registration request or if default PDU establishment indicators were included in the Registration request and were sent to the SMF(s) then the PDU Session Establishment Response(s) are included in the response message. The UE removes any internal resources related to PDU sessions that are not marked active in the received PDU session status. If the PDU session status information was in the Registration Request, the AMF shall indicate the PDU session status to the UE. The NSSAI includes the accepted S-NSSAIs. The accepted S-NSSAIs represent the SST/SD available to the UE for subsequent registration requests. Alternatively, the AMF may generate the PDU session response based on the PDU session parameters or the default PDU session establishment indicator provided by the UE in the Registration Request.

In step 660 the UE sends a Registration Complete message to the AMF to acknowledge if a new Temporary User ID was assigned.

Figure 6B:
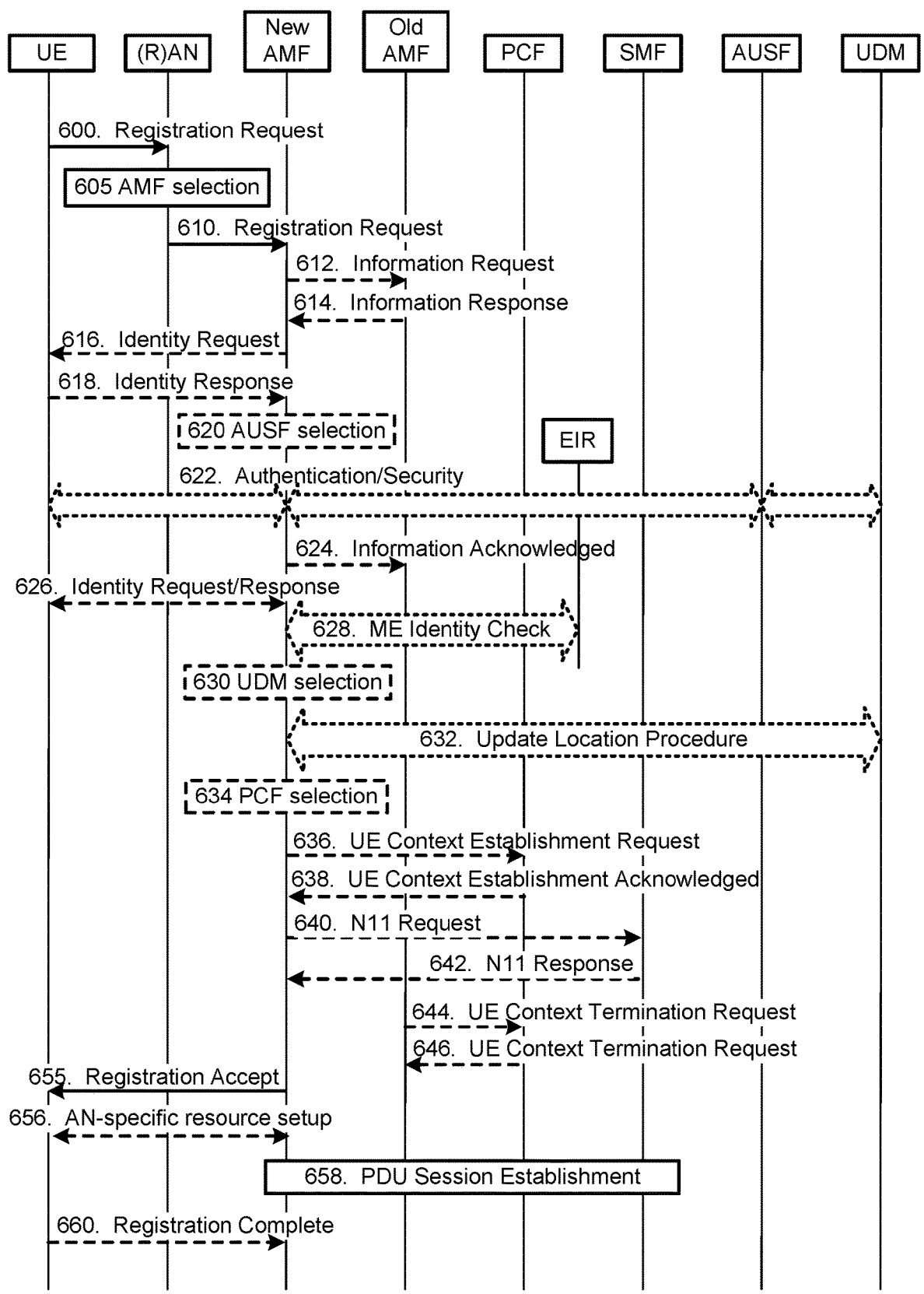
FIG. 6B is a signalling diagram illustrating an embodiment of a registration procedure.

Referring to FIG. 6B, an embodiment of a registration procedure is presented.

In step 600 the UE transmits a registration request to (R)AN: Access Node (AN) message (AN parameters, Registration Request (Registration type, Subscriber Permanent Identifier or Temporary User ID or NSGI, Security parameters, NSSAI, UE 5GCN Capability, PDU session status)). One or more PDU Session Establishment Request messages (S-NSSAI, Domain Network Name (DNN), PDU Session ID, Session Management (SM) information) may be piggybacked onto the Registration request or one or more default PDU session establishment indicators may be included in the Registration request.

In case of 5G-RAN, the AN parameters include e.g., SUPI or the Temporary User ID or NSGI, the Selected Network and NSSAI.

The Registration type indicates if the UE wants to perform an "initial registration" (i.e. the UE is in non-registered state), a "mobility registration" (i.e. the UE is in registered state and initiates a registration due to mobility) or a "periodic registration" (i.e. the UE is in registered state and initiates a registration due to the periodic update timer expired). If included, the Temporary User ID indicates the last serving AMF. The Security parameters are used for Authentication and integrity protection. NSSAI indicates the Network Slice Selection Assistance Information (as defined in clause 5.15 of TS 23.501 [2]. The PDU session status indicates the available PDU sessions in the UE.

In step 605 the R(AN) selects an AMF based on the NSGI, if available on the R(AN). If a SUPI is included or the Temporary User ID does not indicate a valid AMF and there is no NSGI, the (R)AN forwards the Registration Request to a default AMF. The default AMF is responsible for selecting an appropriate AMF for the UE. If additional information is provided in the RRC Request, the (R)AN may select the AMF.

In step 610 the (R)AN transmits a Registration Request to the selected ("new") AMF: N2 message (N2 parameters, Registration Request (Registration type, Permanent User ID or Temporary User ID or NSGI, Security parameters, NSSAI)).

When 5G-RAN is used, the N2 parameters include the Location Information, Cell Identity and the RAT type related to the cell in which the UE is camping.

In step 612 an Information Request may be sent from the new AMF to to old AMF: Information Request to complete the Registration Request.

If the UE's Temporary User ID was included in the Registration Request and the serving AMF has changed since last registration, the new AMF may send Information Request to old AMF including the complete Registration Request IE to request the UE's SUPI and MM Context.

In step 614 an Information Response (SUPI, MM Context, SMF information) may be returned by the old AMF to the new AMF in response to the Information Request 612. The old AMF responds with Information Response to the new AMF including the UE's SUPI and MM Context. If the old AMF holds information about active PDU Sessions, the old AMF may include SMF information including SMF identities and PDU session identities.

In step 616 the AMF may transmit an Identity Request to the UE. If the SUPI is not provided by the UE nor retrieved from the old AMF the Identity Request procedure is initiated by the AMF sending an Identity Request message to the UE. In response to receiving the Identity Request, the UE returns an Identity response including the SUPI in step 618.

In step 620, the AMF may decide to invoke an AUSF. In that case, the AMF shall, based on the SUPI, select an AUSF.

In step 622, the AUSF or the new AMF shall initiate authentication of the UE and NAS security functions. The authentication and security are performed. The procedure including AMF relocation, e.g., due to network slicing, may happen after step 622. In some implementations, the AUSF may initiate authentication. In some implementations, the new AMF initiates authentication.

If the AMF has changed, in step 624 the new AMF transmits to the old AMF an Information Acknowledged message that acknowledges the transfer of UE MM context.

If the authentication/security procedure fails, then the Registration shall be rejected, and the new AMF sends a reject indication to the old AMF. The old AMF continues as if the Information Request was never received.

If the PEI was not provided by the UE nor retrieved from the old AMF, in step 626 the Identity Request procedure is initiated by AMF sending an Identity Request message to the UE to retrieve the PEI.

In optional step 628 the AMF initiates ME identity check with the EIR.

If an update location procedure step 632 is to be performed, in step 630 the AMF, based on the SUPI, selects a UDM.

If the AMF has changed since the last registration, or if there is no valid subscription context for the UE in the AMF, or if the UE provides a SUPI which doesn't refer to a valid context in the AMF, in step 632 the AMF initiates the Update Location procedure. This will include that UDM initiates Cancel Location to old AMF, if any. The old AMF removes the MM context and notifies all possibly associated SMF(s), and the new AMF creates an MM context for the UE after getting the AMF related subscription data from the UDM. In some embodiments, the PEI is provided to the UDM in the Update Location procedure. In some implementations, interactions between the UDM and the PCF include mobility restriction related information (if any).

In step 634, the AMF, based on the SUPI, may select a PCF. In some implementations, the Permanent User ID is used for PCF selection.

In step 636 the AMF may transmit a UE Context Establishment Request to the PCF requesting the PCF to apply operator policies for the UE. Based on the UE Context Establishment Request, in step 638 the PCF returns to the new AMF a UE Context Establishment Acknowledged message that acknowledges the UE Context Establishment Request message.

If the AMF is changed, in step 640 the new AMF notifies each SMF of the new AMF serving the UE with a N11 Request.

The AMF verifies PDU session status from the UE with the available SMF information. In case the AMF has changed the available SMF information has been received from the old AMF. The AMF requests the SMF to release any network resources related to PDU sessions that are not active in the UE. In some implementations, the AMF performs the PDU session status logic. In some implementations, each SMF performs the PDU session status logic.

The UE may include PDU session information in the Registration Request for the initial Registration procedure to indicate that a default PDU session should be established for the specified S-NSSAI(s). The PDU session information should identify the network slice (e.g. S-NSSAI) for the default PDU session. The AMF forwards the request to the selected SMF(s). The SMF(s) may obtain additional PDU session information from the UDM (e.g. DNN, Session and Service Continuity (SSC) mode) to trigger a PDU Session Establishment procedure. In some implementations, the PDU Session Establishment procedure is performed as defined in clause 4.3.2.2.1 (steps 4-8) of TS 23.501 (incorporated herein by reference).

Based on the N11 Request, in step 642 the SMFs transmit a N11 Response to the new AMF. The SMF may decide to trigger e.g. UPF relocation.

If the old AMF previously requested UE context to be established in the PCF, in step 644 the old AMF transmits a UE Context Termination Request to terminate the UE context in the PCF. The PCF responds by transmitting a UE Context Termination Acknowledged message to the old AMF in step 646. If the Registration type indicated by the UE is a periodic registration update, then steps 644 and 646 may be omitted.

In step 655 the AMF sends a Registration Accept message (Temporary User ID, Registration area. Mobility restrictions, PDU session status, NSSAI, Periodic registration update timer) to the UE indicating that the registration has been accepted. Temporary User ID is included if the AMF allocates a new Temporary User ID. Mobility restrictions is included in case mobility restrictions applies for the UE. The AMF indicates the new SMF(s) that were selected for the specified S-NSSAI. The AMF indicates the PDU session status to the UE. In implementations where the PDU Session Establishment request(s) were piggybacked onto the Registration request or if default PDU establishment indicators were included in the Registration request and were sent to the SMF(s) then the PDU Session Establishment Response(s) are included in the response message.

The UE removes any internal resources related to PDU sessions that are not marked active in the received PDU session status. If the PDU session status information was in the Registration Request, the AMF shall indicate the PDU session status to the UE. The NSSAI includes the accepted S-NSSAIs. The accepted S-NSSAIs represent the SST/SD available to the UE for subsequent registration requests. Alternatively, the AMF may generate the PDU session response based on the PDU session parameters or the default PDU session establishment indicator provided by the UE in the Registration Request.

In implementations where PDU session establishment is performed in step 640, the New AMF may include an N2 PDU session request message with the Registration Accept message sent in step 655. In the implementations, receipt of the Registration Accept may trigger, in step 656, AN-specific signalling exchange (RRC Connection Reconfiguration for 3GPP RAN case) between the UE and the R(AN) to establish necessary AN resources for the UE. In some implementations, the NSSAI may be provided to the (R)AN by the new AMF.

If PDU Session Establishment Request message(s) (S-NSSAI, DNN, PDU Session ID, SM information) are piggybacked onto the Registration Request, in step 658 the new AMF forwards the PDU Session Establishment Request to the selected SMF(s) using the PDU Session Establishment procedure. Alternatively, a default PDU session establishment indicator for specified S-NSSAI may be included in the Registration Request. The new AMF forwards the default PDU session establishment to the selected SMF(s).

In step 660 the UE sends a Registration Complete message to the AMF to acknowledge if a new Temporary User ID was assigned.

Figure 7:
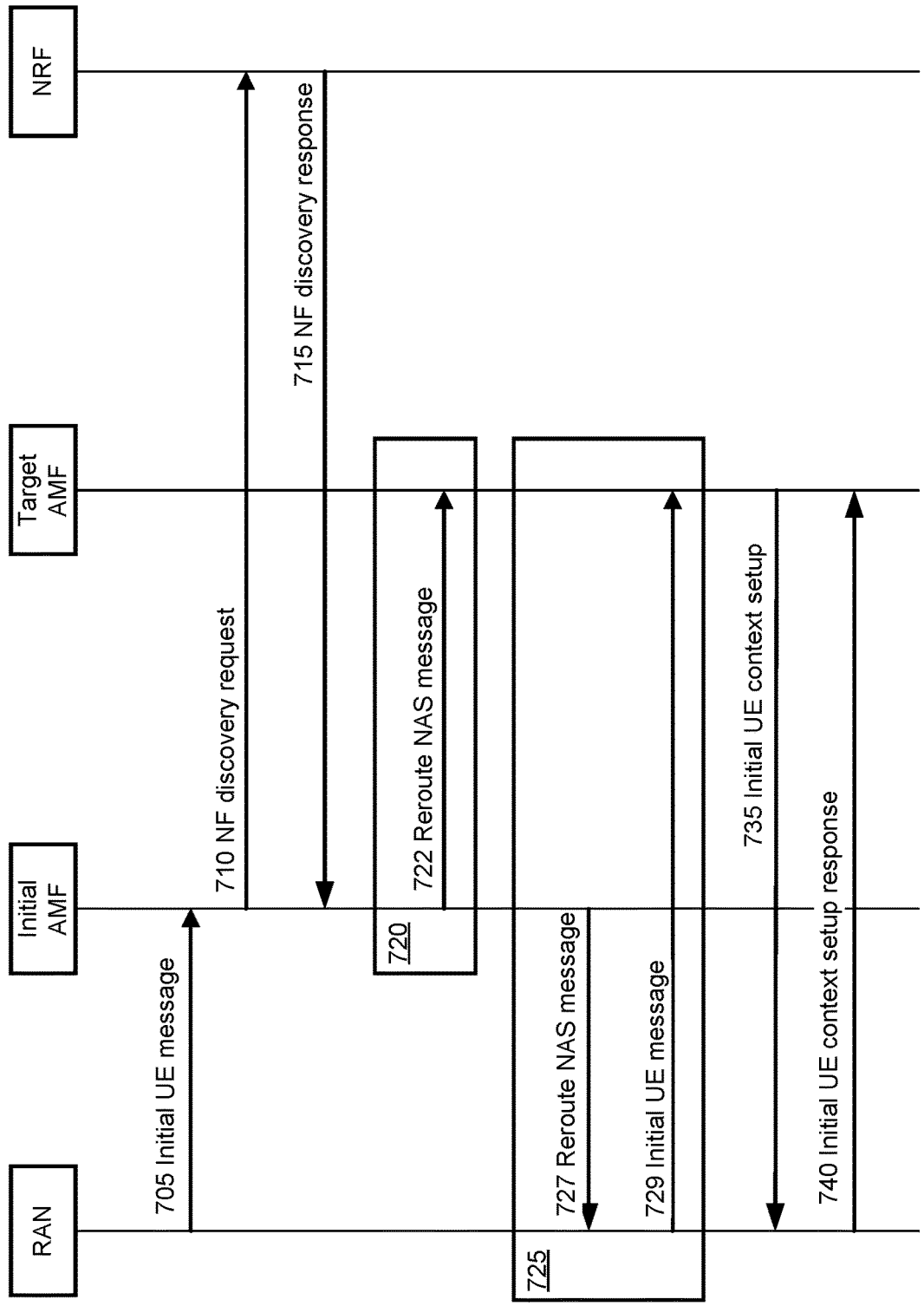
FIG. 7 is a signaling diagram illustrating an embodiment of UE registration with AMF relocation.

Referring to FIG. 7, an embodiment of a registration procedure with AMF relocation is presented. When an AMF receives a Registration request, the AMF may need to reroute the Registration request to another AMF, e.g. due to network slicing is used and the initial AMF is not the appropriate AMF to serve the UE. The Registration with AMF relocation procedure, is used to reroute the NAS message of the UE to the target AMF during a registration procedure.

The initial (first) AMF and the target (second) AMF register their capabilities at the NRF.

In step 705, the (R)AN sends the Initial UE message to the first AMF. The Initial UE message carries a Non-Access Stratum (NAS) Registration message (FIG. 6). The first AMF is the default AMF if there is no valid Temporary ID and there is no NSGI. Otherwise, the first AMF is the appropriate serving target AMF.

In step 710, if the default AMF is not the appropriate target AMF then the default AMF decides to reroute the NAS message to another AMF. The default AMF sends an NF discovery request, which includes the NSSAI, to the NRF to find a proper target AMF that has required capabilities to serve the UE.

In step 715, based on the information about registered NFs and required capabilities, a target AMF is selected and the NRF transmits a NF discovery response identifying the target AMF.

If the initial AMF, based on NSSAI, local policy and subscription information, determines to forward the NAS message to the target AMF directly, in procedure 720 the initial AMF sends Reroute NAS message to the target AMF in step 722. The Reroute NAS message includes the information about N2 terminating point for (R)AN and the NAS message carried at step 705. If network slicing is used and the initial AMF updates the NSSAI at step 705, the updated NSSAI is included in the redirection NAS message and procedure 725 is skipped.

If the initial AMF, based on local policy and subscription information, determines to forward the NAS message to the target AMF via (R)AN, in procedure 725 the initial AMF sends Reroute NAS message to the (R)AN in step 727. The Reroute NAS message includes the information about the target AMF and the NAS message carried at step 705. If network slicing is used and the initial AMF updates the NSSAI at step 705, the updated NSSAI is included in the redirection NAS message. In step 729, based on the Reroute NAS message the (R)AN sends the Initial UE message to the target AMF.

After receiving the first NAS message transmitted at procedure 720 or 725, in step 735 the target AMF sends to the (R)AN the Initial UE context setup request which includes information about the N2 terminating point for target AMF and a new Temp ID assigned by the target AMF is also included.

In step 740 (R)AN sends the Initial UE context response to the target AMF.

Figure 8:
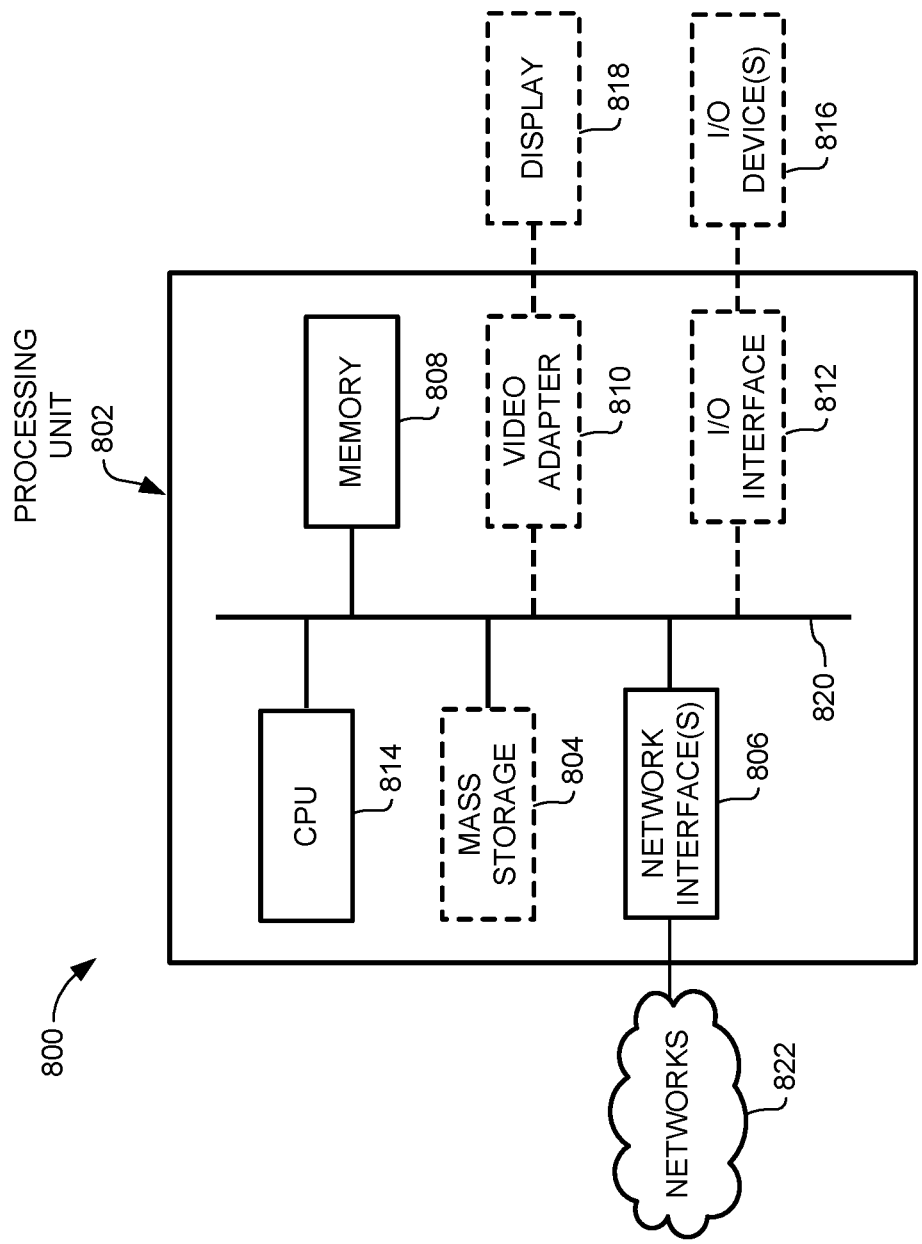
FIG. 8 is a block diagram of an embodiment of a computing system.

FIG. 8 is a block diagram of an embodiment of a computing system 800 that may be used for implementing the devices and methods disclosed herein. In particular, the network nodes may each include one or more computing systems 800. The network functions described above may be instantiated by execution on one or more computing systems 800. In some embodiments, a network function may be instantiated across a plurality of computing systems 800 across a plurality of geographic locations. The UE described above may comprise a computing system 800 adapted to perform the methods described herein.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 800 includes a processing unit 802. The processing unit 802 typically includes a central processing unit (CPU) 814, a bus 820 and a memory 808, and may optionally also include a mass storage device 804, a video adapter 810, and an I/O interface 812 (shown in dashed lines). The computing system 800 may further include one or more network interface(s) 806 for connecting the computing system 800 to communication networks 822.

The CPU 814 may comprise any type of electronic data processor, and may include one or more cores or processing elements. The memory 808 may comprise any type of non-transitory system memory such as static random access memory (SRAM), dynamic random access memory (DRAM), synchronous DRAM (SDRAM), read-only memory (ROM), or a combination thereof. In an embodiment, the memory 808 may include ROM for use at boot-up, and DRAM for program and data storage for use while executing programs. The bus 820 may be one or more of any type of several bus architectures including a memory bus or memory controller, a peripheral bus, or a video bus.

The mass storage 804 may comprise any type of non-transitory storage device configured to store data, programs, and other information and to make the data, programs, and other information accessible via the bus 820. The mass storage 804 may comprise, for example, one or more of a solid state drive, hard disk drive, a magnetic disk drive, or an optical disk drive.

The video adapter 810 and the I/O interface 812 provide optional interfaces to couple external input and output devices to the processing unit 802. Examples of input and output devices include a display 818 coupled to the video adapter 610 and an I/O device 816 such as a touch-screen coupled to the I/O interface 812. Other devices may be coupled to the processing unit 802, and additional or fewer interfaces may be utilized. For example, a serial interface such as Universal Serial Bus (USB) (not shown) may be used to provide an interface for an external device. Alternatively, the computing system 800 may rely upon the network interface(s) 806 for connection to available mass storage(s), video adapter(s) 610, and I/O interface(s) 812 available on the networks 822.

Based on the foregoing description, embodiments of the present invention may provide any one or more of:

A method for registering a User Equipment (UE) for connection to a service available on a network, the method comprising:
  receiving a registration request from the UE;
  selecting an access and mobility function (AMF) of the network based on the registration request;
  transmitting the registration request to the selected AMF;
  receiving a registration response from the selected AMF; and,
  transmitting the received registration response to the UE.

In some embodiments, the AMF is selected based on a temporary identifier assigned to the UE or a Network Slice Group Indicator.

In some embodiments, the AMF is selected by transmitting the registration request to a default AMF for selection of the selected AMF.

In some embodiments, the network comprises an access node.

In some embodiments, the access node transmits the registration request directly to the selected AMF.

In some embodiments, the access node includes the temporary identifier or the Network Slice Group Indicator with the registration request.

A method in an access and mobility function (AMF) of a network, the method comprising:
  receiving, by the AMF, a registration request pertaining a User Equipment (UE) connected to an access node of the network;
  at least partially in response to the registration request:
    interacting with a Network Repository Function (NRF), using information in the received registration request to obtain network slice configuration information pertaining to the UE;
    identifying a second AMF based at least in part on the obtained network slice configuration information; and
    forwarding the registration request to the second AMF.

Although the present application describes specific features and embodiments, it is evident that various modifications and combinations can be made thereto without departing from the invention. The specification and drawings are, accordingly, to be regarded simply as an illustration as defined by the appended claims, and are contemplated to cover any and all modifications, variations, combinations or equivalents that fall within the scope of those claims.

We claim:

1. A method comprising:
  receiving, by an access and mobility function (AMF), a registration request sent by a user equipment (UE), the registration request comprising: Network Slice Selection Assistance Information (NSSAI) including at least one Single Network Slice Selection Assistance Information (S-NSSAI), the at least one S-NSSAI identifying a network slice requested by the UE; and indicator for one or more Protocol Data Unit (PDU) sessions associated with the at least one S-NSSAI, wherein the indicator for each of the one or more PDU sessions indicates a PDU session that is to be activated for the network slice identified by the at least one S-NSSAI; and transmitting, by the AMF to a session management function (SMF) associated with the network slice identified by the at least one S-NSSAI, a request to establish the one or more PDU sessions that are to be activated for the network slice identified by the at least one S-NSSAI.

2. The method of claim 1, further comprising:

receiving, by the AMF, a PDU session establishment response sent by the SMF, the PDU session establishment response indicating which of the one or more PDU sessions were established and activated for the network slice identified by the at least one S-NSSAI; and transmitting, by the AMF, a registration response to the UE, the registration response comprising the PDU session establishment response.

3. The method of claim 2, wherein the registration response further comprises an identifier of the SMF associated with the network slice identified by the at least one S-NSSAI.

4. The method of claim 2, wherein registration requested is received from one of: an access point of the network associated with the UE and a second AMF of the network and the AMF is associated with the at least one S-NSSAI.

5. The method of claim 1, wherein the registration request comprises: a plurality of S-NSSAIs; and indicator for one or more Protocol Data Unit (PDU) session associated with each S-NSSAI, wherein each S-NSSAI identifies a network slice requested by the UE, and wherein the indicator for each of the one or more PDU session associated with each respective S-NSSAI indicates a PDU session that is to be activated for the network slice identified by the respective S-NSSAI.

6. The method of claim 5, further comprising:

transmitting, by the AMF to a SMF associated with the slice/service type identified by each respective S-NSSAI, a request to establish the one or more PDU sessions that are to be activated for the network slice identified by the respective S-NSSAI.

7. The method of claim 6, further comprising:

receiving, by the AMF, a PDU session establishment response sent by each respective SMF associated with the network slice identified by the respective S-NSSAI, the PDU session establishment response sent by each respective SMF indicating which of the one or more PDU sessions were established and activated for the network slice identified by the respective S-NSSAI.

8. The method of claim 7, further comprising:

transmitting, by the AMF, a registration response comprising the S-NSSAIs that have been accepted and the PDU session establishment response received from each respective SMF associated with the network slice identified by a S-NSSAI.

9. The method of claim 1, wherein each of the one or more PDU sessions is always-on PDU sessions.

10. A computing system comprising:
a processor; and
a non-transitory computer-readable medium storing computer-readable instructions which, when executed by the processor cause the computing system to implement an access and mobility function that is configured to:
receive a registration request sent by a user equipment (UE), the registration request comprising: Network Slice Selection Assistance Information (NSSAI) including at least one Single Network Slice Selection Assistance Information (S-NSSAI), the at least one S-NSSAI identifying a network slice requested by the UE; and indicator for one or more Protocol Data Unit (PDU) session associated with the at least one S-NSSAI, wherein the indicator for each of the one or more PDU session indicates a PDU session that is to be activated for the slice/service type identified by at least one S-NSSAI; and transmit to a session management function (SMF) associated with the network slice identified by the at least one S-NSSAI, a request to establish the one or more PDU sessions to be activated for network slice identified by the at least one S-NSSAI.

11. The computing system of claim 10, wherein the AMF is further configured to:

receive a PDU session establishment response sent by the SMF, the PDU session establishment response indicating which of the one or more PDU sessions were activated for the network slices identified by the at least one S-NSSAI; and transmit a registration response to the UE, the registration response comprising the PDU session establishment response.

12. The computing system of claim 11, wherein the registration response further comprises an identifier of the SMF associated with the network slice identified by the at least one S-NSSAI.

13. The computing system of claim 11, wherein registration requested is received from one of: an access point of the network associated with the UE and a second AMF of the network and the AMF is associated with the at least one S-NSSAI.

14. The computing system of claim 11, wherein the registration request comprises: a plurality of S-NSSAIs; and indicator for one or more Protocol Data Unit (PDU) session associated with each S-NSSAI, wherein each S-NSSAI identifies a network slice requested by the UE, and wherein the indicators for each of the one or more PDU session identifiers for each respective S-NSSAI indicates a PDU session that is to be activated for the network slice identified by the respective S-NSSAI.

15. The computing system of claim 14, wherein the AMF is further configured to:

transmit to a SMF associated with the networks slice identified by each respective S-NSSAI, a request to establish the one or more PDU sessions that are to be activated for the network slice identified by the respective S-NSSAI.

16. The computing system of claim 15, wherein the AMF is further configured to:

receive a PDU session establishment response sent by each respective SMF associated with the network slice identified by the respective S-NSSAI, the PDU session establishment response sent by each respective SMF indicating which of the one or more PDU sessions were established for the slice/service type identified by the respective S-NSSAI.

17. The computing system of claim 16, wherein the AMF is further configured to:

transmit a registration response comprising the S-NSSAIs that have been accepted and the PDU session establishment response received from each respective SMF associated with the network slice identified by a S-NSSAI.

18. The computing system of claim 10, wherein each of the one or more PDU sessions is always-on PDU sessions.

19. A non-transitory computer-readable medium storing computer-readable instructions which, when executed by a processor of a computing system to cause the computing system to implement an access and mobility (AMF) function that is configured to:
- receive a registration request sent by a user equipment (UE), the registration request comprising: Network Slice Selection Assistance Information (NSSAI) including at least one Single Network Slice Selection Assistance Information (S-NSSAI), the at least one S-NSSAI identifying a slice/service type requested by the UE; and indicator for one or more Protocol Data Unit (PDU) session associated with the at least one S-NSSAI, wherein the indicator for each of the one or more PDU session indicates a PDU session that is to be activated for the network slice identified by at least one S-NSSAI; and
- transmit to a session management function (SMF) associated with the network slice identified by the at least one S-NSSAI, a request establish the one or more PDU sessions that are to be activated for the network slice identified by at least one S-NSSAI.

20. The non-transitory computer-readable medium of claim 19, wherein the AMF is further configured to:
- receive a PDU session establishment response sent by the SMF, the PDU session establishment response indicating which of the one or more PDU sessions were activated for the network slice identified by the at least one S-NSSAI; and
- transmit a registration response to the UE, the registration response comprising the PDU session establishment response.

* * * * *